(12) United States Patent
Koenigsmann

(10) Patent No.: US 6,356,814 B1
(45) Date of Patent: Mar. 12, 2002

(54) SPACECRAFT MAGNETIC TORQUER FEEDBACK SYSTEM

(75) Inventor: Hans Joerg Koenigsmann, Torrance, CA (US)

(73) Assignee: Microcosm, Inc., El Segundo, CA (US)

( * ) Notice: Subject to any disclaimer, the term of this patent is extended or adjusted under 35 U.S.C. 154(b) by 0 days.

(21) Appl. No.: 09/245,611

(22) Filed: Feb. 3, 1999

(51) Int. Cl.[7] .............................. G06F 17/00; G05D 3/00
(52) U.S. Cl. .................... 701/13; 701/3; 701/226; 244/158 R; 244/164; 244/166
(58) Field of Search ........................ 701/13, 3, 4, 10, 701/226; 244/158 R, 164, 165, 166, 169, 171, 170, 167, 173, 168, 3.16, 3.21

(56) References Cited

U.S. PATENT DOCUMENTS

| | | | | |
|---|---|---|---|---|
| 4,489,383 A | * | 12/1984 | Schmidt, Jr. ................. | 701/13 |
| 4,746,085 A | * | 5/1988 | Bruderle ..................... | 244/166 |
| 5,025,381 A | * | 6/1991 | Goodzeit et al. ............. | 701/13 |
| 5,123,617 A | * | 6/1992 | Linder et al. ................ | 244/166 |
| 5,248,118 A | * | 9/1993 | Cohen et al. ................ | 244/164 |
| 5,349,532 A | * | 9/1994 | Tilley et al. ................. | 701/226 |
| 5,413,293 A | * | 5/1995 | Gomberg et al. ............ | 244/166 |
| 5,610,820 A | * | 3/1997 | Shankar et al. ............... | 701/13 |
| 5,765,780 A | * | 6/1998 | Barskey et al. ............. | 244/165 |
| 5,788,189 A | * | 8/1998 | Iida .............................. | 244/166 |

* cited by examiner

Primary Examiner—Jacques H. Louis-Jacques
(74) Attorney, Agent, or Firm—Noel F. Heal

(57) ABSTRACT

A magnetic torquer (10) for spacecraft attitude control, providing a torque that is controllable over an extended range greater than a normally used linear range, and thereby providing a higher ratio of maximum torque to device weight. In one form of the torquer, a feedback loop including a sensor (20), a signal subtraction circuit (24), a controller (28) and an adjustable power supply (16), continuously determines a corrected command signal that results in the generation of a desired magnetic moment and a corresponding torque, over the extended range, regardless of non-linearity across the extended range. In an alternate form of the torquer, the corrected command signal is generated from a mathematical model (56) of the magnetic torquer (10). Use of the invention also minimizes the effect of any residual magnetic moment that might by present when the actuating current is reduced to zero.

4 Claims, 3 Drawing Sheets

- End of Linear Range
- End of Non-Linear Range

SPACECRAFT MAGNETIC TORQUER FEEDBACK SYSTEM

BACKGROUND OF THE INVENTION

This invention relates generally to attitude control systems for spacecraft and, more particularly, to attitude control systems using magnetic torque rods. As is well known, operational spacecraft fall freely in space and, without some mechanism of attitude control, would rapidly lose their desired orientation or attitude. One of the most common mechanisms for attitude control of spacecraft operating near the earth is a magnetic torquer. Basically, the torquer includes a magnetic dipole, which interacts with the earth's magnetic field to produce a desired torque or turning moment. The torquer includes an iron core rod and a conductive winding having multiple turns about the rod. A source of current applied to the winding produces a dipole magnetic field of a desired strength, which interacts with the earth's magnetic field to produce the desired torque on the rod. The rod, of course, is rigidly held in the spacecraft, and the torque is transferred to the entire spacecraft. Typically, three torque rods are used, to provide attitude control in three-dimensional space.

Because of the iron core rod in each magnetic torquer, the device is relatively heavy and contributes significantly to the launch cost, which can be up to $50,000 per pound for payloads launched into geosynchronous orbit. Therefore, it will be appreciated that there is an ongoing need to reduce the weight or increase the efficiency of magnetic torquers, because this will reduce the launch cost of each space mission in which torquers are employed.

The relationship between the electrical current applied to a magnetic torquer and the resultant dipole magnetic moment is also well known. The magnetic moment produced by the dipole, increases linearly as the applied current is increased either positively or negatively from zero. Outside of a linear regime extending symmetrically on each side of a zero current point, the magnetic moment increases less rapidly than the applied current and the characteristic curve of the device begins to flatten off. If the current is then reduced toward zero, the magnetic field strength generated by the device tends to retain its previously higher value and there may be a residual dipole moment when the current reaches zero again. The characteristic relationship between applied current (or voltage) to the dipole magnetic moment follows a well known hysteresis curve. For spacecraft torquers, it is desirable to have a near-zero residual magnetic moment when the current is reduced to zero, since any residual torque will affect spacecraft orientation over time and will require subsequent correction.

Spacecraft magnetic torquers are normally operated only in the linear regime, in which the dipole moment is directly proportional to the applied electrical current or voltage. Spacecraft attitude controllers are typically linear controllers, which expect sensors and actuators to have linear behavior. In most cases, the analysis to verify stability and performance of an attitude control system has been a linear analysis, and non-linear components would render this analysis invalid. Therefore, imposing a linearity requirement on magnetic torquers simplifies control of the spacecraft but has a penalty in that the maximum moment and torque obtainable from each torquer is limited by the magnetic moment at the end of the linear regime. Larger moments can be obtained only by using a larger and heavier torque rod. Clearly, it would be desirable to increase the linear range of the magnetic torquer, since this would increase the efficiency of the device and reduce the weight required to produce a given maximum magnetic dipole moment. The present invention is directed to this end.

SUMMARY OF THE INVENTION

The present invention provides a mechanism and a corresponding method for its use, for increasing the effective linear range of operation of a magnetic torquer for spacecraft attitude control, the torquer having a magnetic core and a conductive coil wound on the core. Briefly, and in general terms, the method comprises the steps of generating a corrected command signal needed to produce a desired magnetic moment, wherein the corrected command signal compensates for non-linearity in variation of the magnetic moment with the command signal; and applying the corrected command signal to the magnetic torquer, to produce the desired magnetic moment. The magnetic torquer is operated over a range extending beyond a linear regime in which torquers are normally operated, and a significantly higher torque is obtainable from a torquer of given weight.

In one disclosed embodiment of the invention, the step of determining a corrected command signal includes sensing magnetic field strength near the torquer, to obtain a signal indicative of magnetic moment; generating an error signal by computing the difference between a nominal command signal and the signal indicative of magnetic moment; and combining the nominal command signal with the error signal to obtain the corrected command signal. In accordance with an alternate embodiment of the invention, the step of generating a corrected command signal includes applying the desired magnetic moment to a mathematical model of the magnetic torquer; and obtaining from the mathematical model the corrected command signal corresponding to the desired magnetic moment. More specifically, the step of generating a corrected command signal in this embodiment includes retrieving the corrected command signal from a look-up table relating magnetic moments to corresponding command signals. The method may further include the step of generating data for storage in the look-up table.

The invention may also be defined as a magnetic torquer for use in spacecraft attitude control, comprising a magnetic core and an actuating coil wound around the core; an adjustable power supply for receiving a command signal and generating an actuating current to the coil; and means for generating a desired magnetic moment in the torquer, over an extended range that exceeds a conventionally used linear range, whereby a larger torque can be produced without increasing the mass of the magnetic core. In one embodiment of the invention, the means for generating a desired magnetic moment includes a feedback control system that generates a corrected command signal to provide the desired magnetic moment. More specifically, the feedback control system includes a magnetic field sensor to provide a signal indicative of the magnetic moment generated by the torquer; a subtractor circuit for generating an error signal from the difference between the signal from the magnetic field sensor and a nominal command signal; and a signal combiner circuit for combining the error signal with the nominal command signal, to obtain a corrected command signal to be applied to the adjustable power supply.

In the alternate embodiment of the invention, the means for generating a desired magnetic moment includes a mathematical model of the magnetic torquer; wherein the model provides for any given desired magnetic moment a corrected command signal for application to the adjustable power supply.

It will be appreciated from the foregoing that the present invention represents a significant advance in magnetic torquers for use in spacecraft. In particular, the invention extends the effective linear range of a torquer, to provide for more efficient operation and a higher maximum torque from a torquer of given weight. Other aspects and advantages of the invention will become apparent from the following more detailed description, taken in conjunction with accompanying drawings.

DESCRIPTION OF THE PREFERRED EMBODIMENTS

Figure 1:
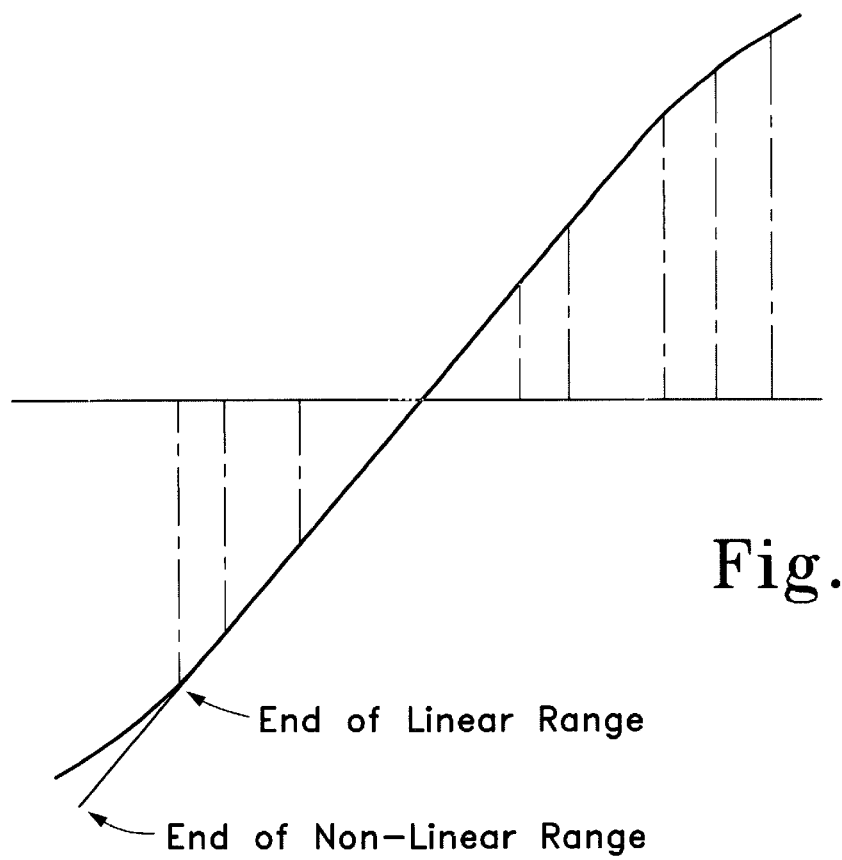
FIG. 1 is graph showing the variation of magnetic moment with actuating current in a typical magnetic torquer.

As shown in the drawings for purposes of illustration, the present invention pertains to magnetic torquers for spacecraft attitude control. Magnetic torque rods, or torquers, are widely used to control the attitude or orientation of earth-orbiting satellites. A torquer includes an iron core around which electrical current is passed, to produce a dipole magnetic field. The dipole interacts with the earth's magnetic field and produces a desired torque that is imparted to the spacecraft. As shown in FIG. 1, a magnetic torquer has a limited linear range of operation, in which the magnetic moment is directly proportional to the applied electrical current. Attitude control systems for spacecraft are normally designed to operate the magnetic torquers only in the linear range, but this limits the maximum magnetic moment that can be obtained without increasing the weight of the magnetic core.

Figure 2:
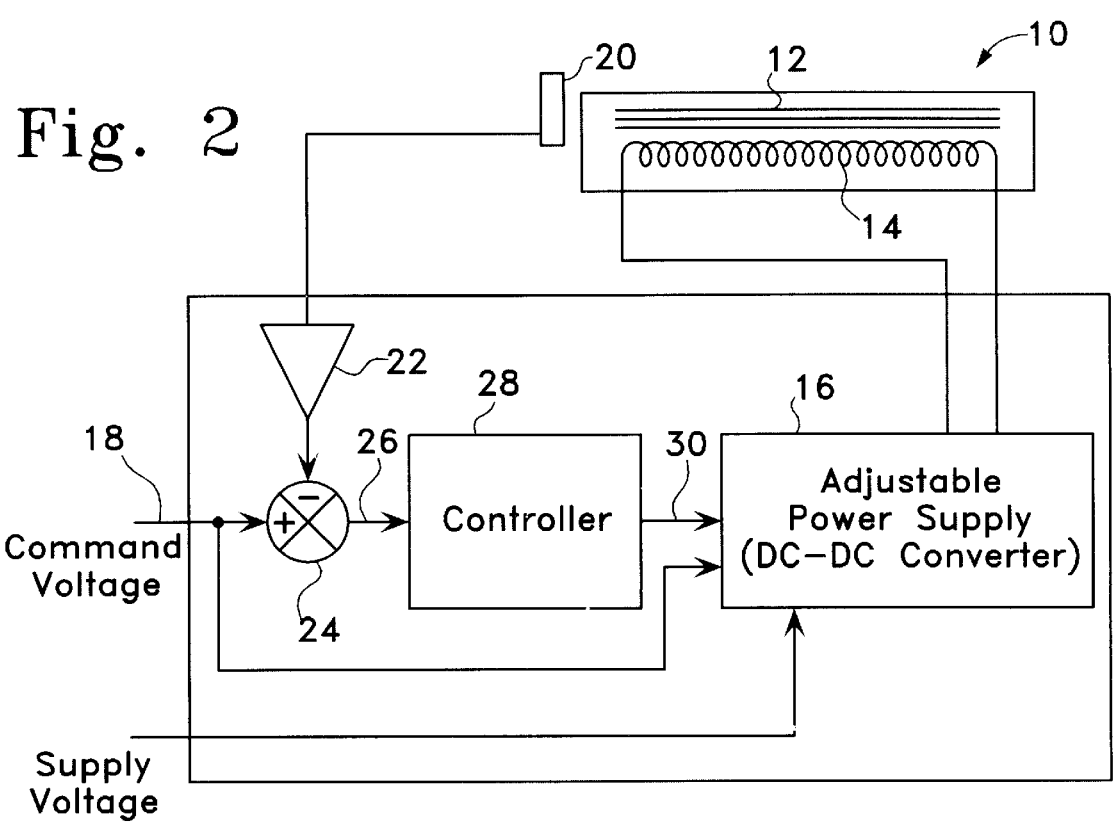
FIG. 2 is a block diagram of the system of the invention.

In accordance with the invention, a mechanism is provided to increase the effective linear range of a magnetic torquer, to provide a larger maximum magnetic moment from a torquer of given weight. FIG. 2 shows a torquer feedback mechanism in accordance with the present invention. The torquer, indicated by reference numeral 10, includes an iron core 12 and a surrounding coil of wire 14. An adjustable power supply 16 supplies current to the coil 14, in accordance with a command signal applied to the power supply on line 18. In the system of the invention a Hall sensor 20, positioned near the torquer 10, measures the magnetic field strength generated by the torquer. A signal proportional to the field strength is amplified in an amplifier 22, and is input to a signal subtraction circuit 24, where this signal is subtracted from a nominal command signal to produce a correction signal on output line 26. The device is calibrated to ensure that, when operating in the linear range, the amplified Hall sensor signal is identical to the nominal command signal. Therefore, a zero correction signal is generated on line 26 when operating in the linear range. When operating in the non-linear range, the Hall sensor output tends to "fall behind" the nominal command signal as the characteristic curve of FIG. 1 flattens out beyond the linear range. The resultant error signal on line 26 is applied to a controller 28, which outputs a hysteresis correction on line 30 to the adjustable power supply 16. The hysteresis correction on line 30 is combined with the nominal command signal on line 18. The power supply 16, therefore, increases the current applied to the torquer coil 14, which results in an increased magnetic moment and an increased torque. The error signal is driven to zero and the magnetic moment is maintained in an effectively linear relationship with the command signal applied to the device.

The feedback system described above has the additional advantage that it practically eliminates the effect of any residual magnetism in the torquer. Ideally, when the command signal has zero value the Hall sensor 20 should also generate a zero output. In the event of a residual sensed magnetic moment, an error signal will be generated and an appropriate correction applied to the torquer coil 16. Although a torquer can be designed to have a low residual magnetic field strength of only 0.15–0.25% of the maximum linear range, use of the feedback system ensures that the residual effect is reduced to 0.1% or less.

Figure 3:
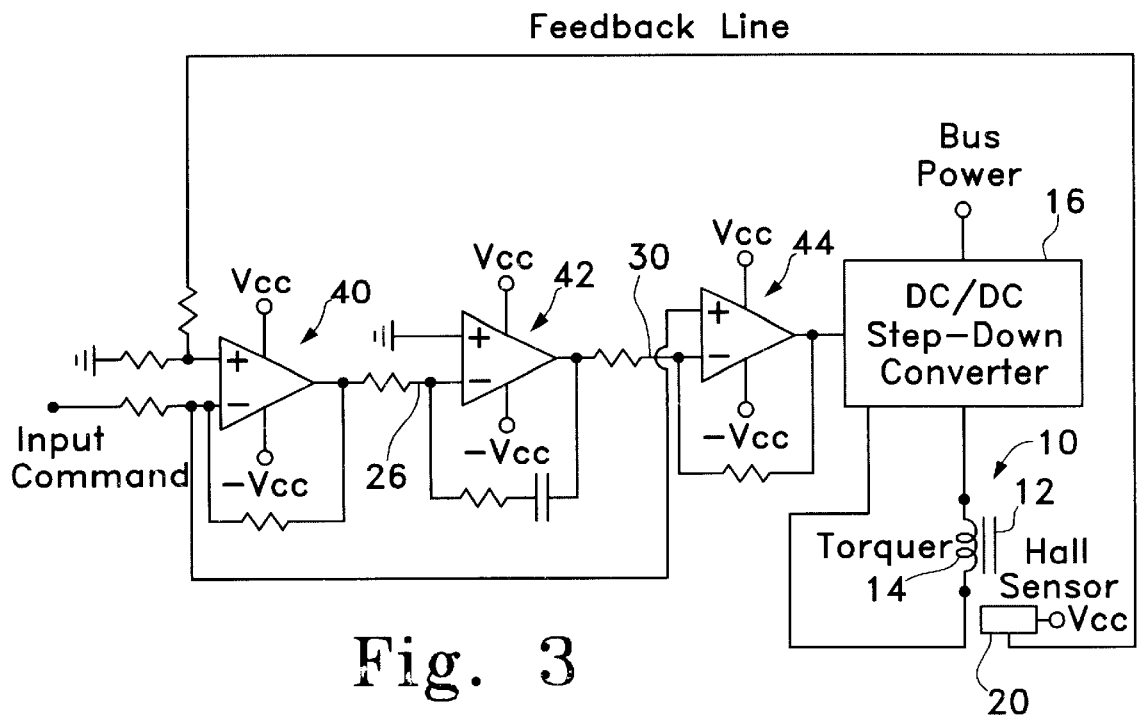
FIG. 3 is a schematic diagram corresponding to the block diagram of FIG. 2.

FIG. 3 shows the system of the invention in schematic form. The amplifier 22 and signal subtraction circuit 24 are implemented as a first operational amplifier 40. The controller 28 is implemented as a second operational amplifier 42. A third operational amplifier 44 effects summation of the nominal command signal and the correction signal. The adjustable power supply 16 is a direct-current-to-direct-current (DC—DC) step-down converter.

Figure 4:
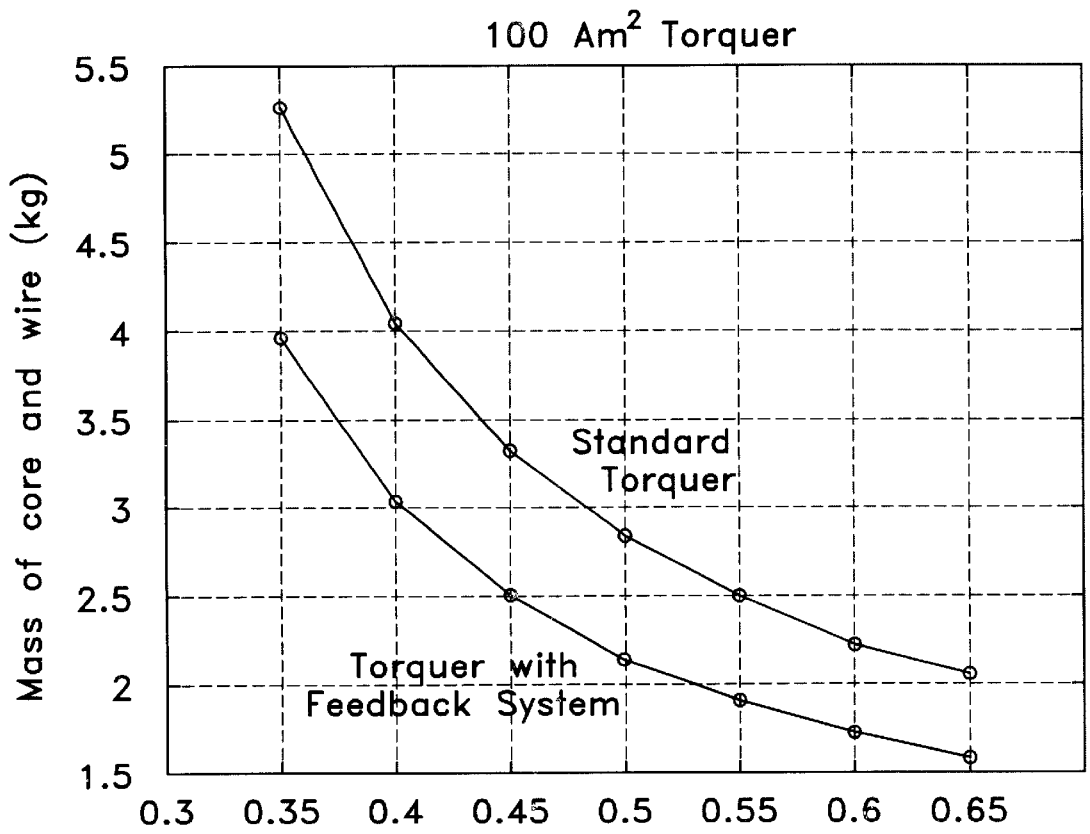
FIG. 4 is a graph comparing the mass of a conventional magnetic torquer with the mass of the torquer of the present invention, for various lengths of torquer.

FIG. 4 compares the mass of a typical torquer conventionally controlled over its linear range, with the same torquer controlled in accordance with the present invention, over an extended range. The torquer for which the mass-versus-length curve is shown has a nominal magnetic moment of 100 $Am^2$ (ampere-meter$^2$). (The magnetic moment for a planar coil is given by the product of the current through the coil and the cross-sectional area of the coil.) For a torquer of 0.45 meter length, approximately 25% of the mass is saved by use of the invention.

Figure 5:
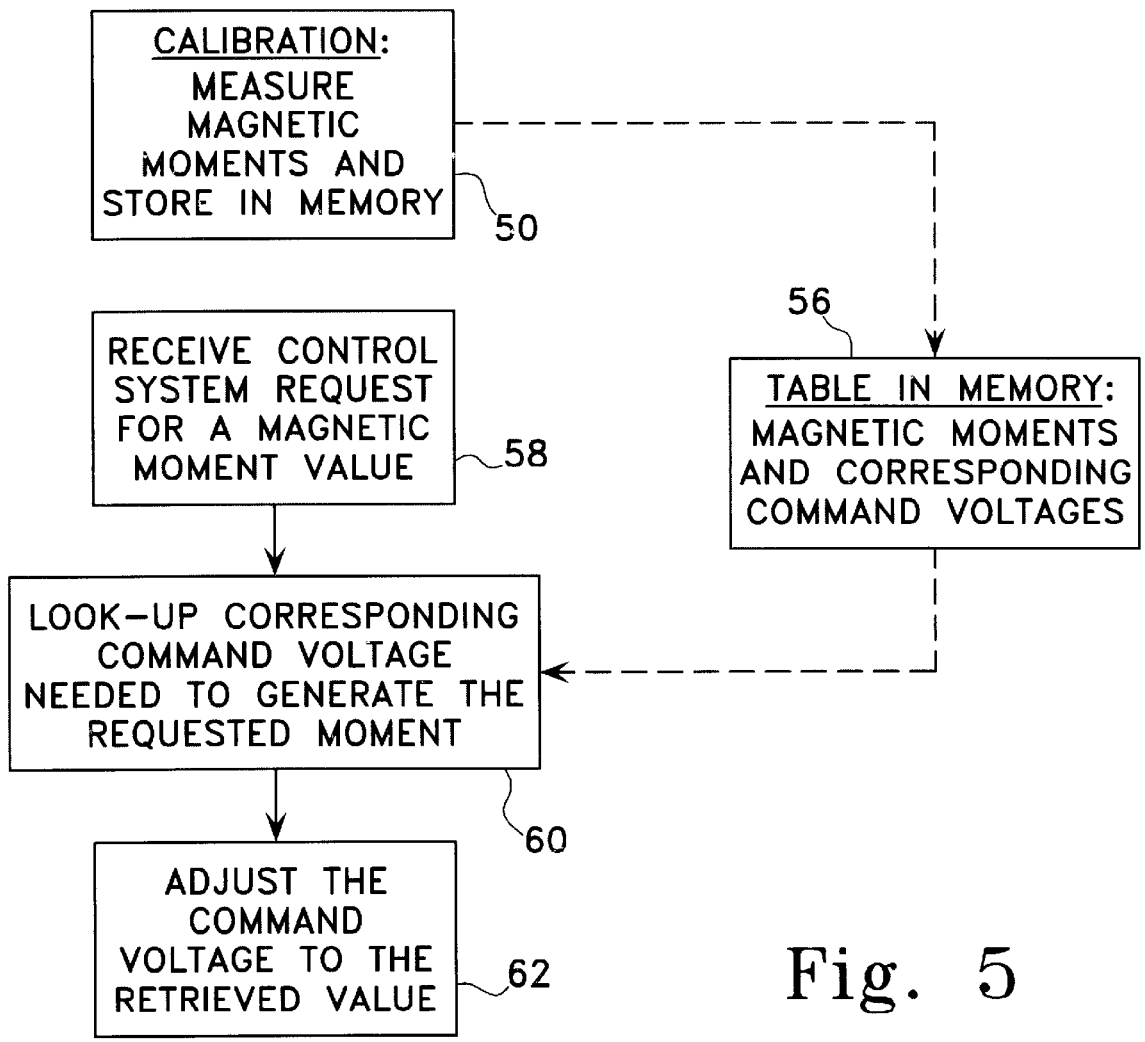
FIG. 5 is a functional flowchart showing the steps performed in accordance with an alternate embodiment of the present invention.
Figure 6:
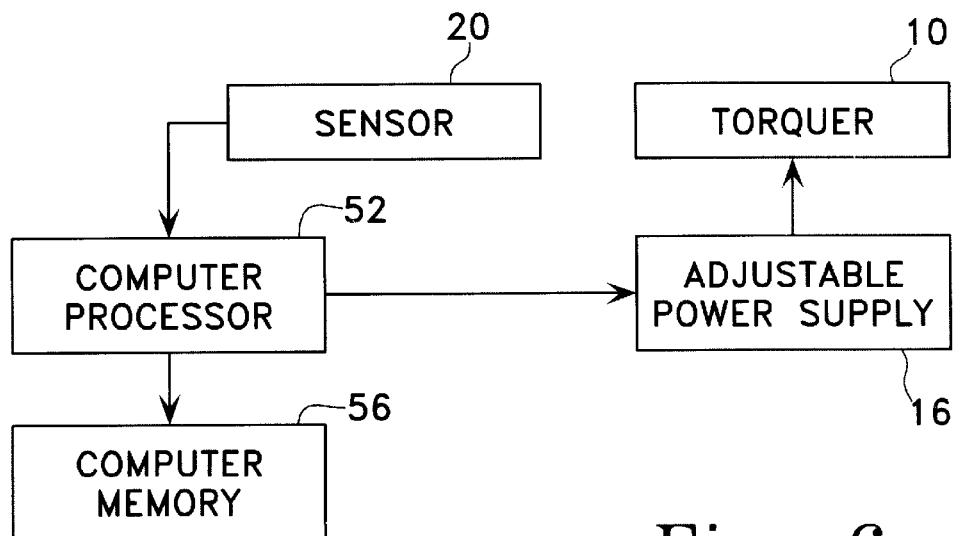
FIG. 6 is block diagram showing implementation of the invention to perform the functions as shown in FIG. 5.

In another embodiment of the invention, the characteristic curve of the torquer 10 is stored in a computer memory, as indicated in FIGS. 5 and 6. The torquer characteristics may take the form of a mathematical model or, more simply, a stored table of command voltages and corresponding magnetic moments. In a calibration procedure performed prior to operation of the system, indicated at 50, a computer processor 52 generates a series of command signals, on line 54 to the adjustable power supply 16, which in turn generates electrical signals to the torquer 10. Sensor 20 provides a measure of the corresponding values of magnetic moment. These are either used to update the mathematical model, or are simply stored in a table in computer memory 56, together with the corresponding values of the command voltage signal.

In operation, the computer processor 52 receives a request, as indicated in block 58, from an attitude control system (not shown) for a specific value of magnetic moment from the torquer 10. The computer processor 52 uses the mathematical model to determine the corresponding voltage command signal, or simply looks in the memory table 56, as indicated in block 60, to determine the corresponding voltage command signal needed to generate the requested magnetic moment value. Over the linear range of the device, the model or stored table will reflect the linear relationship between the command signals and the resultant magnetic moments. Beyond the linear range, however, the model or stored table will correctly yield a higher (than linear) value of the command signal, to take account of the fall-off in magnetic moment beyond the linear range. Moreover, for a desired zero magnetic moment, the model or stored table will correctly reflect any residual magnetism error and will yield a command signal to compensate for the error. Having determined the appropriate command signal, the computer processor 52 then generates this command signal to achieve the desired magnetic moment.

Since the memory table 56 can only store discrete values of magnetic moments and corresponding command voltage signals, it will be appropriate to interpolate between values to obtain a more accurate result. In both disclosed embodiments of the invention, it will be desirable to impose limits (in both polarities) on the command voltage signal.

It will be appreciated from the foregoing that the present invention represents a significant advance in the magnetic torquers. In particular, use of the invention results in significant weight savings, or provides for higher magnetic moments and torques without an increase in weight. The invention also compensates for any residual magnetic moments, which would otherwise have an unwanted influence on spacecraft attitude. It will also be appreciated that, although specific embodiments of the invention have been described in detail for purposes of illustration, various modifications may be made without departing from the spirit and scope of the invention. Accordingly, the invention should not be limited except as by the appended claims.

What is claimed is:

1. A method of using a magnetic torquer for spacecraft attitude control, the torquer having a magnetic core and a conductive coil wound on the core, the method comprising the steps of:

generating a corrected command signal needed to produce a desired magnetic moment, wherein the corrected command signal compensates for non-linearity in variation of the magnetic moment with the command signal; and applying the corrected command signal to the magnetic torquer, to produce the desired magnetic moment;

and wherein the magnetic torquer is operated over a range extending beyond a linear regime in which torquers are normally operated, and a significantly higher torque is obtainable from a torquer of given weight;

and wherein the step of generating a corrected command signal includes sensing magnetic field strength near the torquer, to obtain a signal indicative of magnetic moment, generating an error signal by computing the difference between a nominal command signal and the signal indicative of magnetic moment, and combining the nominal command signal with the error signal to obtain the corrected command signal.

2. A method of using a magnetic torquer for spacecraft attitude control, the torquer having a magnetic core and a conductive coil wound on the core, the method comprising the steps of:

generating a corrected command signal needed to produce a desired magnetic moment, wherein the corrected command signal compensates for non-linearity in variation of the magnetic moment with the command signal; and applying the corrected command signal to the magnetic torquer, to produce the desired magnetic moment;

and wherein the magnetic torquer is operated over a range extending beyond a linear regime in which torquers are normally operated, and a significantly higher torque is obtainable from a torquer of given weight;

and wherein the step of generating a corrected command signal includes applying the desired magnetic moment to a mathematical model of the magnetic torquer, and obtaining from the mathematical model the corrected command signal corresponding to the desired magnetic moment.

3. A magnetic torquer for use in spacecraft attitude control, comprising:

a magnetic core and an actuating coil wound around the core;

an adjustable power supply for receiving a command signal and generating an actuating current to the coil; and means for generating a desired magnetic moment in the torquer, over an extended range that exceeds a conventionally used linear range, whereby a larger torque can be produced without increasing the mass of the magnetic core;

wherein the means for generating a desired magnetic moment includes a feedback control system that generates a corrected command signal to provide the desired magnetic moment, and wherein the feedback control system includes a magnetic field sensor to provide a signal indicative of the magnetic moment generated by the torquer a subtractor circuit for generating an error signal from the difference between the signal from the magnetic field sensor and a nominal command signal and a signal combiner circuit for combining the error signal with the nominal command signal, to obtain a corrected command signal to be applied to the adjustable power supply.

4. A magnetic torquer for use in spacecraft attitude control, comprising:

a magnetic core and an actuating coil wound around the core;

an adjustable power supply for receiving a command signal and generating an actuating current to the coil; and means for generating a desired magnetic moment in the torquer, over an extended range that exceeds a conventionally used linear range, whereby a larger torque can be produced without increasing the mass of the magnetic core;

wherein the means for generating a desired magnetic moment includes a mathematical model of the magnetic torquer, and wherein the model provides, for any given desired magnetic moment, a corrected command signal for application to the adjustable power supply.

* * * * *